Nov. 16, 1948. S. WALD 2,454,107
SERVOMECHANISM
Filed Dec. 31, 1947
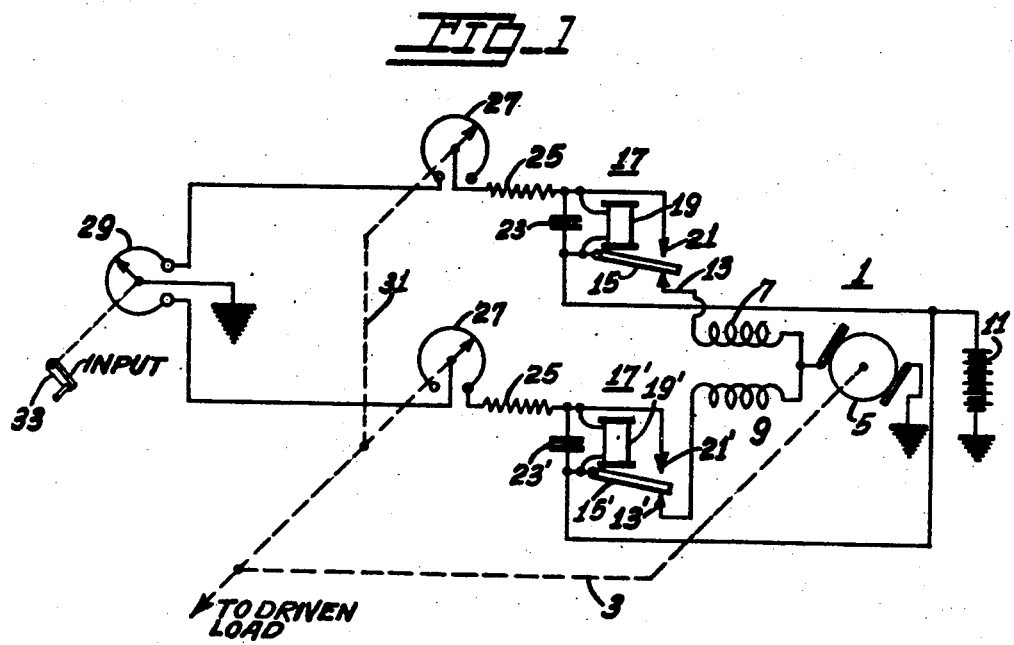
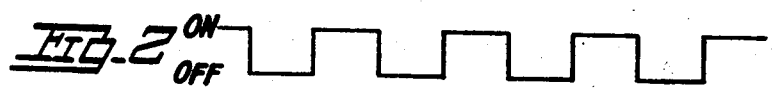
Inventor:
Sidney Wald
By J. L. Whittaker
ATTORNEY Patented Nov. 16, 1948

2,454,107

UNITED STATES PATENT OFFICE 2,454,107

SERVO MECHANISM

Sidney Wald, Collingswood, N. J., assignor to Radio Corporation of America, a corporation of Delaware Application December 31, 1947, Serial No. 794,978

2 Claims. (Cl. 318—28)

This invention relates to improvements in servo-mechanisms or follow-up systems, and more particularly to methods and means for controlling the energization of an electric motor in response to deviations in the position of a load driven by said motor with respect to the position of a control or input shaft.

It is ordinarily desirable in a follow-up system for the energization of the motor to be more or less smoothly or continuously variable between zero and some maximum value, the current at any given instant being a function of the deviation between the output shaft and the control shaft. This can be accomplished by supplying power to the motor through variable impedance devices such as resistors or thermionic tubes; however, such arrangements involve uneconomical use of the available power, since a large portion of it must be wasted in the impedance device. A further disadvantage lies in the fact that variable impedance devices for handling substantial amounts of power must be large, heavy, and expensive; thermionic tube arrangements are usually complicated as well as bulky. On-off devices such as switches or relays may be used to control the motor, but these ordinarily do not give smooth stepless variation and may introduce hunting and inaccuracy of operation of the system.

It is the principal object of the present invention to provide an electrical follow-up system wherein the motor is controlled by switches or relays, but with a smoothness or continuity of the same order as that provided by variable impedance devices.

More specifically, it is an object of this invention to provide follow-up systems in which the motor is energized by current pulses which recur at a sufficiently high rate as to give the same effect as a non-pulsating current, and which vary in their rate or repetition in accordance with the required degree of effective energization.

A further object of the present invention is to provide a motor control system of the described type including a periodic switch or vibrating relay having variable length periods of closure alternating with substantially constant open circuit periods, and means for varying the frequency of operation to vary the average current supplied to the motor.

Still another object of the invention is to provide a system of the type set forth in the foregoing objects which comprises a Wheatstone bridge circuit which is normally balanced to provide the same ratio between "on" and "off" times of the periodic switch means independently of the nominal position of the output shaft.

The invention will be described with reference to the accompanying drawing, wherein:

Figure 1 is a schematic diagram of a servo or follow-up system embodying the invention, and Figures 2, 3 and 4 are oscillograms showing the operation of the system of Figure 1 under various conditions.

The system of Figure 1 includes a motor 1 coupled as indicated schematically by the dash line 3 to a load device, not shown. In the present example, the motor 1 is of the series wound D.-C. type, including an armature 5 and two field windings 7 and 9. The fields 7 and 9 are so wound and connected that if the armature is energized through one, for example the winding 7, the motor tends to rotate clockwise, and if the armature is energized through the other field, the motor tends to rotate counterclockwise.

A source such as a battery 11 is provided for supplying energy to the motor 1, and is connected to the terminal of the field winding 7 through the contacts 13 and 15 of a relay 17. The relay 17 also includes an actuating coil 19, and a further contact 21. The contacts 13 and 15 engage when the coil 19 is energized less than a predetermined amount and the coil 19 is short-circuited by engagement of the contacts 15 and 21. A capacitor 23 is shunted across the coil 19.

The lower terminal of the relay coil 19 is connected to the source 11; the upper terminal is connected through a fixed resistor 25 and a variable resistor 27 to one end of an adjustable voltage divider 29. The movable arm of the voltage divider 29 is returned to the source 11, completing the circuit through the coil 19.

The terminal of the field winding 9 of the motor 1 is connected to the source 11 through the contacts 13' and 15' of a relay 17' which is similar to the relay 17. The relay 17' is provided like the relay 17, with a capacitor 23' across its coil 19', and is connected to the source 11 through resistors 25' and 27' similar to the resistors 25 and 27, and the voltage divider 29. The variable resistors 27 and 27' are mechanically ganged, as indicated schematically by the dash line 31, and are driven by the motor 1 together with the load device. The connections are such that upon rotation of the motor so as to increase the resistance of one of the resistors 27 and 27', the resistance of the other will be decreased by a like amount.

The operation of the above described system is substantially as follows: Suppose the movable contact 15 of the relay 17 to be in its lower position, as shown in Figure 1. The capacitor 23 is in the process of being charged from the source 11, through the resistors 25, 27 and 29. The voltage applied to the coil 19 is the voltage between the terminals of the capacitor 23. Initially, this is not sufficient to operate the relay 17. The capacitor 23 continues to charge until its terminal voltage reaches the value necessary to cause the coil 19 to move the contact 15 into engagement with the contact 21. When this occurs, the capacitor 23 and the coil 19 are short-circuited, and discharge rapidly until the coil 19 is no longer able to hold the contact 15 in its upper position. The contacts 15 and 13 engage again, and the cycle is repeated.

During the periods when the contact 15 is in its lower position and the capacitor 23 is charging, the motor 1 is fully energized through its field winding 7. During the periods when the contact 15 is in its upper position and the capacitor 23 is discharging, the motor field 7 is disconnected. The lengths of the former periods (motor energized) depend upon the sum of the resistances 25, 27 and 29 included in the charging circuit of the capacitor 23. The lengths of the latter periods (field 7 disconnected) depend only upon the supply voltage, the capacitance of the capacitor 23 and the characteristics of the relay 17, and thus are constant and independent of the resistances of the resistors 25, 27 and 29.

Referring to Figure 2, with an intermediate value of total resistance in the circuit of the coil 19, the "on" and "off" periods are substantially equal. When the total resistance is higher, the "on" periods become longer, as shown in Figure 3, while the "off" periods remain the same length as before. Figure 4 shows the result of decreasing the total resistance in the circuit of the coil 19; the "on" periods become shorter, while the "off" periods are still the same length.

The average voltage supplied to the motor 1 through its field winding 7 is proportional to:

$$\frac{t}{t+k}$$

where $t$ is the length of the "on" periods and $k$ is the length of the "off" periods. The relay 17 and its associated circuit elements are designed to make the periods $t$ and $k$ short enough, in the normal operation of the system, that the pulses of motor torque are averaged or integrated by the inertia of the motor armature and its load.

The relay 17' operates like the relay 17 to periodically energize the motor 1 for rotation in the reverse direction. Preferably the "off" time of the relay 17' is of the same length $k$ as that of the relay 17. The average voltage applied to the motor tending to produce clockwise rotation is then proportional to:

$$\frac{t}{t+k} - \frac{t'}{t'+k}$$

where $t'$ is the "on" time of the relay 17'. When $t$ and $t'$ are equal, the motor provides no average torque, and when $t'$ is greater than $t$, the average torque tends to produce counterclockwise rotation.

The motor 1 will run in the required direction, increasing one of the resistances 27 and 27' and decreasing the other, until the "on" periods $t$ and $t'$ of the relays 17 and 17' are equal. Under this condition, the sum of the resistances 25, 27 and the upper portion of the voltage divider 29 is equal to the sum of the resistances 25', 27' and the lower portion of the voltage divider 29. The motor 1 and its load will then remain stationary as long as no change is made.

The voltage divider 29 may be adjusted by a mechanical input, supplied for example by a manually operable crank 33. Motion of the crank 33 in either direction will add resistance in the circuit of one of the relay coils 19 and 19', and subtract an equal resistance from the circuit of the other relay coil. This increases the "on" time of one relay and decreases the "on" time of the other; the motor 1 again drives the resistors 27 and 27' to equalize the "on" periods $t$ and $t'$, and then comes to rest. The position of the motor and its load thus corresponds substantially continuously to the position of the input device 33.

I claim as my invention:

1. A motor control system including an electric motor, means for energizing said motor including a periodic switch comprising a relay having an actuating coil and contact means short-circuiting said coil upon energization of said coil by more than a predetermined amount, and further contact means which close to supply energy to said motor only when said first mentioned contact means are open; a capacitor connected in parallel with said actuating coil, and means including a variable resistor for charging said capacitor when said first mentioned contact means is open, at a rate depending upon the resistance of said resistor, whereby the effective energization of said motor is controlled by said resistor.

2. A follow-up system including an electric motor, means for energizing said motor to develop a torque in one direction of rotation, said means including a periodic switch having an actuating circuit, said switch remaining open during intervals of substantially constant lengths and remaining closed during intervals of lengths which depend upon the energization of said actuating circuit; further means, similar to said first mentioned means for energizing said motor to develop a torque in the opposite direction of rotation; a bridge network including the actuating circuit of said first mentioned means and that of said last mentioned means in two of its arms, and two variable resistors connected respectively in series with said means; an adjustable voltage divider constituting two further arms of said bridge circuit, and means responsive to rotation of said motor to adjust said two variable resistors differentially, whereby said motor tends to maintain said bridge circuit in balance with the ratio between the lengths of the opened and closed periods of said first periodic switch equal to the ratio between the lengths of the opened and closed periods of the other of said periodic switches.

SIDNEY WALD.

No references cited.